United States Patent
Huze et al.

(10) Patent No.: US 11,858,173 B2
(45) Date of Patent: Jan. 2, 2024

(54) PROCESS AND APPARATUS FOR HEAT TREATMENT OF A POLYMER POWDER

(71) Applicant: Arkema Inc., King of Prussia, PA (US)

(72) Inventors: Denis Huze, Fontaine Sous-Jouy (FR); Benoit Brule, Beaumont-le-Roger (FR); Nadine Decraemer, Beaumontel (FR); Jerome Pascal, Grandchain (FR); Bruce Clay, Boyertown, PA (US)

(73) Assignee: Arkema Inc., King of Prussia, PA (US)

( * ) Notice: Subject to any disclaimer, the term of this patent is extended or adjusted under 35 U.S.C. 154(b) by 0 days.

(21) Appl. No.: 17/258,464

(22) PCT Filed: Jul. 9, 2019

(86) PCT No.: PCT/US2019/040958
§ 371 (c)(1),
(2) Date: Jan. 7, 2021

(87) PCT Pub. No.: WO2020/014197
PCT Pub. Date: Jan. 16, 2020

(65) Prior Publication Data
US 2021/0283804 A1    Sep. 16, 2021

Related U.S. Application Data

(60) Provisional application No. 62/696,390, filed on Jul. 11, 2018.

(51) Int. Cl.
*B29B 13/00*       (2006.01)
*B29C 41/00*       (2006.01)
(Continued)

(52) U.S. Cl.
CPC ............ *B29B 13/021* (2013.01); *B29C 41/04* (2013.01); *B29K 2071/00* (2013.01)

(58) Field of Classification Search
CPC ....... B29B 13/00; B29B 13/02; B29B 13/021; B29C 41/00; B29C 41/04
See application file for complete search history.

(56) References Cited

U.S. PATENT DOCUMENTS 3,474,165 A    10/1969   Rakes et al.
4,051,981 A    10/1977   Mandlak
(Continued)

FOREIGN PATENT DOCUMENTS

CN    201342333 A    11/2009
CN    204630301 A    9/2015
(Continued)

OTHER PUBLICATIONS

U.S. Appl. No. 15/830,100, filed Dec. 4, 2017, Decraemer.
(Continued)

*Primary Examiner* — Jacob T Minskey
*Assistant Examiner* — Matthew Hoover
(74) *Attorney, Agent, or Firm* — David Weisberg

(57) ABSTRACT

A method and apparatus for heat treating powders of semi-crystalline or crystallizable polymers. The apparatus includes a heating device for heating the powder to a temperature that is less than the melting temperature of a highest melting crystalline form of the powder, a vessel containing the powder that is exposed to heat produced by the heating device, and a mechanism for moving the vessel to cause the powder within the vessel to move with respect to the vessel.

13 Claims, 3 Drawing Sheets

(51) Int. Cl.
*B29B 13/02* (2006.01)
*B29C 41/04* (2006.01)
*B29K 71/00* (2006.01)

(56) References Cited

U.S. PATENT DOCUMENTS

| | | | |
|---|---|---|---|
| 5,383,615 | A | 1/1995 | Calka et al. |
| 6,308,704 | B1 | 10/2001 | Wennerberg |
| 7,193,032 | B2 | 3/2007 | Culbert et al. |
| 7,847,057 | B2 | 12/2010 | Muller et al. |
| 9,580,551 | B2 | 2/2017 | Vanelli et al. |
| 9,587,107 | B2 | 3/2017 | Bertelo et al. |
| 2008/0171847 | A1 | 7/2008 | Weyell et al. |
| 2012/0036497 | A1 | 2/2012 | Karthik et al. |
| 2013/0323416 | A1* | 12/2013 | Bertelo ............... C08L 61/16 524/592 |
| 2015/0122527 | A1 | 5/2015 | Chung |
| 2015/0369536 | A1 | 12/2015 | Schiavolin |
| 2016/0108229 | A1* | 4/2016 | Decraemer ........... C08L 61/16 525/534 |

FOREIGN PATENT DOCUMENTS

| | | |
|---|---|---|
| CN | 205130133 A | 4/2016 |
| CN | 205412755 A | 8/2016 |
| CN | 205438887 A | 8/2016 |
| CN | 106541507 A | 3/2017 |
| CN | 107310068 A | 11/2017 |
| CN | 206613405 A | 11/2017 |
| CN | 206871725 A | 1/2018 |
| DE | 10225075 A1 | 11/2003 |
| DE | 102009004998 A1 | 4/2010 |
| JP | H11286555 A | 10/1999 |
| JP | 2002283343 A2 | 10/2002 |
| WO | WO2017116885 A1 | 7/2017 |

OTHER PUBLICATIONS

The Wayback Machine "Rotary Kiln Temperature Control", https://web.archive.org/web/20080501151135/http://www.rpi.edu:80/dept/c . . . p. 1 or 1 Rotary Kiln (or rotary dyers) are used extensively ind.

Wikipedia—"Coffee Roasting"; https://en.wikipedia.org/w/index.php?title=coffee_roating&oldid=840580856 p. 1-11.

* cited by examiner

PROCESS AND APPARATUS FOR HEAT TREATMENT OF A POLYMER POWDER

This application is a national stage application under 35 U.S.C. § 371 of PCT/US2019/040958 filed Jul. 9, 2019, which claims benefit to U.S. patent application Ser. No. 62/696,390, filed Jul. 11, 2018.

FIELD OF THE INVENTION

The invention relates to a process and apparatus for heat treatment of powders of semi-crystalline or crystallizable polymers, such as polyaryletherketone (PAEK) polymers.

BACKGROUND OF THE INVENTION

As is described in U.S. Pat. No. 9,587,107 to Arkema, the disclosure of which is incorporated by reference herein in its entirety and for all purposes, in a selective laser sintering (SLS) process, a bed of polymer powder is preheated in a preheating chamber and then distributed as a thin layer in a sintering chamber where a laser is used to heat specific parts of the bed and selectively sinter part of the polymer powder in a predetermined pattern. Following this, a second layer is produced in the bed and the material in the second layer is again heated and selectively sintered in a pattern. At the same time, the second layer is also fused to the sintered portion of the first layer. Successive layering and sintering can thus produce a three dimensional piece that is then removed from the unsintered powder bed. Aspects of such a process are also described, for example, in U.S. Pat. No. 7,847,057, the disclosure of which is incorporated by reference herein in its entirety and for all purposes.

A preliminary heat treatment step prior to the SLS process has been shown to provide more uniform melting of the powder, improve powder flow and lower attrition rates in applications that require powder handling at elevated temperatures. Heat treatment processes are described for example, in U.S. Patent App. Pub. Nos. 20160108229 A1 and 20160122527A1 and U.S. patent application Ser. No. 15/830,100, the disclosures of which are incorporated by reference herein in their entirety and for all purposes. U.S. Pat. No. 9,580,551, the disclosure of which is incorporated by reference herein in its entirety and for all purposes, describes a heat treatment process for improving the efficacies of the SLS process and product quality.

While the heat treatment process may be disclosed in the prior art, relatively little has been disclosed about the equipment capable of performing the heat treatment at large scale production volumes. Described hereinafter is a method and apparatus for the preliminary heat treatment step of a polymer powder that is heat treated for example, for use in a SLS process as described in, for example, U.S. Pat. No. 9,587,107.

Carrying out a heat treatment in a static oven poses problems and disadvantages since the heat has to be transferred by conduction, while both polymer and air have a low thermal conductivity. The heat transfer further becomes difficult with increasing batch size because the outside layer acts as an insulation layer. Beyond a certain thickness, it may become impossible to heat all powder.

SUMMARY OF THE INVENTION

Generally, the present invention is a process and apparatus for carrying out a process for heat treating semi-crystalline or crystallizable polymer (e.g., PAEK) powder at a given temperature (or series of given temperatures or gradient of temperatures) inside of a vessel. The vessel is moved (e.g., by rotation, circulation, partial rotation, partial circulation, vibration, etc.) so that the powder shifts or moves, preferably substantially constantly, more preferably constantly, on the hot interior surface(s) of the vessel, thereby providing for a uniform or more uniform heating of the powder and also avoiding clumping, agglomeration, and/or sticking on the surface of the vessel. This also provides a higher percentage or amount of heat treated powder available for further processing and use, e.g. in an SLS process.

Compared to static ovens, a rotating oven ensures a more efficient and homogeneous heat transfer by repeated contact of the powder on the hot surface of the oven. As a consequence, the duration of the heat treatment of the powder can be substantially reduced and the batch size can be increased. Both these factors improve productivity. In addition, the risk of overheating and production of agglomerates is reduced.

In one embodiment, the present invention provides an apparatus for heat treating semi-crystalline or crystallizable polymers which are in powder form and which may be polymorphic. The apparatus comprises a heating device for heating the powder to a temperature that is less than the melting temperature of a highest melting crystalline form of the powder; a vessel that is exposed to heat produced by the heating device, the vessel defining an interior region for containing the powder; and means for moving the vessel to cause the powder within the vessel to move with respect to the vessel.

Another embodiment of the invention provides a method for heat treating semi-crystalline or crystallizable polymers (including polymorphic polymers) which are in powder form. The method comprises heating monomorphic or polymorphic semi-crystalline or crystallizable polymer powder that is contained within an interior region of a vessel to a temperature that is less than the melting temperature of a highest melting crystalline form of the powder; and moving the vessel to cause the heated semi-crystalline or crystallizable polymer powder within the vessel to move with respect to the vessel.

For PAEK, the heat treatment is carried out preferably at a temperature of about 230° C. to about Tm minus 10° C., where Tm is the melting point of the highest melting polymorph or of the crystalline phase.

DETAILED DESCRIPTION OF THE INVENTION

Figure 1:
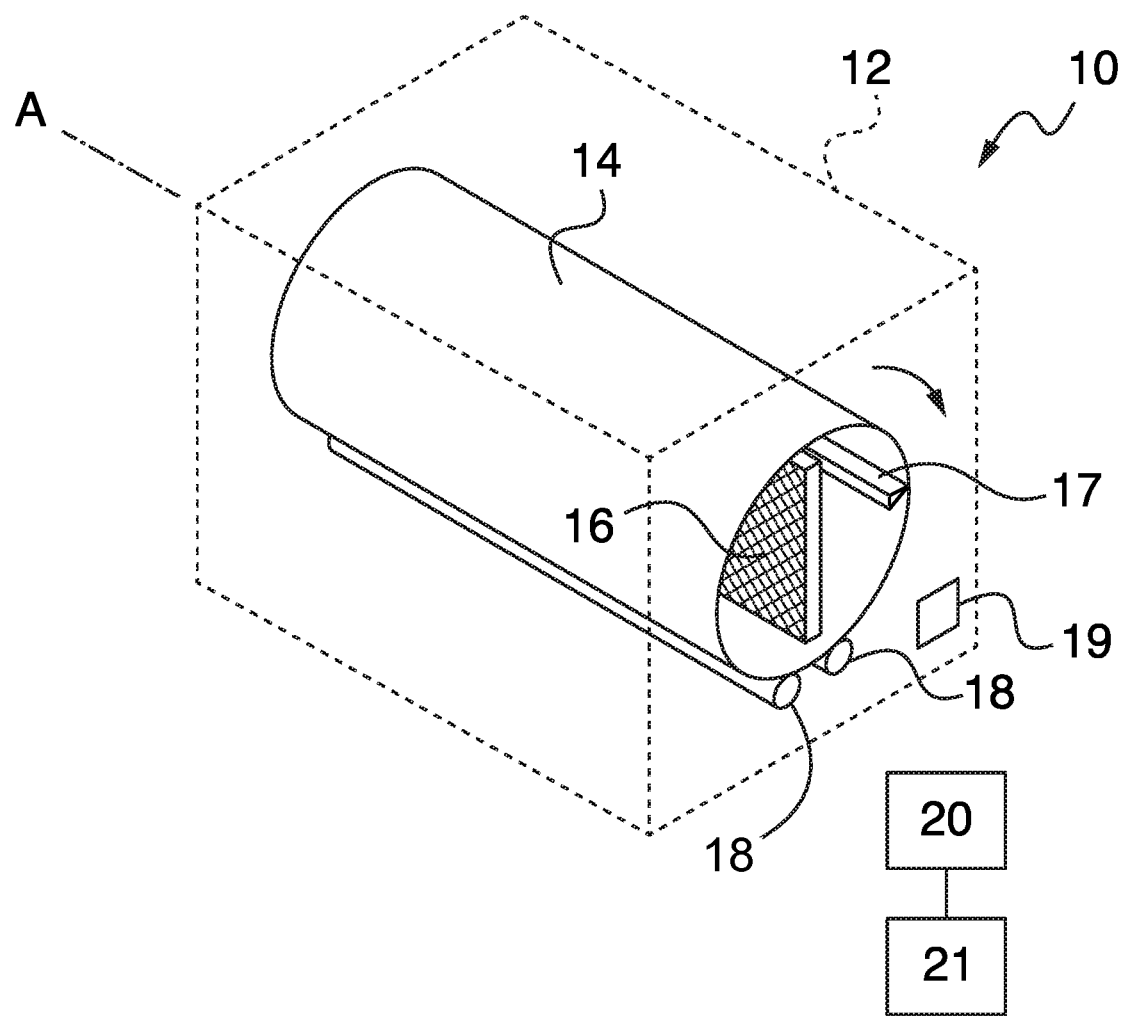
FIG. 1 depicts an isometric view of an apparatus for heat treating semi-crystalline or crystallizable polymer powder, which is shown schematically, according to a first exemplary embodiment of the invention.

FIG. 1 depicts an isometric view of an apparatus 10 for heat treating semi-crystalline or crystallizable polymer powder, which is shown schematically, according to a first exemplary embodiment of the invention. The apparatus 10 generally comprises a heating device 12, a vessel 14 for containing the powder that is heated by the heating device 12, mixing elements such as a grid or sieve 16 positioned within the interior of the vessel 14 and at least partially immersed within the powder (not shown), and a means for moving 18 the vessel 14.

The heating device 12 is a mechanism for producing heat and exposing the vessel 14 and its contents to the heat. The heating device 12 may be an oven in which the vessel 14 is positioned. Alternatively, the heating device 12 may be a heating element that is connected to or part of the vessel 14. As another alternative, the vessel 14 could be heated using circulating hot oil (or other fluid). The heating device 12 may be any conventional heating mechanism that is known to those skilled in the art and is not limited to that which is shown and described. For example, the heating device may comprise a heating element which converts electricity into heat through the process of resistive heating or it may comprise hot oil which may be circulating.

The vessel 14 is a container having any shape, such as a hollow tube or cylinder, in which the powder is contained. It should be understood that the size and shape of the vessel 14 can vary. The vessel 14 is configured to rotate about its longitudinal axis A (also referred to herein as the axis of rotation). The vessel 14 may be composed of a thermally conductive material, in particular a metal or metal alloy such as stainless steel, such as grades 316L or 904, for example. The ends of the vessel 14 may be either open (as shown) or closed. A removable lid closure (not shown) may be removably applied over one open end of the vessel 14. The vessel 14 may be a closed system to prevent contamination or the escapement of powder during operation. According to other embodiments, the vessel 14 may be configured to permit a gas (e.g., an inert gas, such as nitrogen) to flow through the vessel 14. The vessel 14 may be either removably or permanently mounted within the apparatus 10.

The mixing element may comprise sieve 16 which is a foraminous plate having holes, pores or openings through which the powder can pass. Alternatively, the sieve 16 may be provided in the form of a rack having cross-wise dividing members, i.e., like a conventional oven rack. A plurality of sieves may be positioned within the interior of the vessel 14, according to certain embodiments. The size and shape of the openings in the sieve 16 may vary. The sieve 16 may be composed of a thermally conductive material such as stainless steel (such as grades 316L or 904) or other metal or metal alloy, for example. Alternatively, the sieve 16 may be replaced by a plurality of mixing elements having a compact shape (such as balls, cubes, cylinders or the like) and capable of independent motion within the vessel, composed of either metal or ceramic, for example. As another alternative, the sieve 16 may be omitted altogether.

According to one aspect of the invention, the sieve 16 is coupled to the vessel 14 such that the sieve 16 rotates along with the vessel 14. According to a different aspect of the invention, the sieve 16 is coupled to a fixed point (e.g., on the heating device 12) such that the vessel 14 rotates relative to the stationary sieve 16. In yet another aspect of the invention, sieve 16 can move or rotate in a direction opposite to that of the vessel 14.

According to one aspect of the invention, the vessel 14 comprises means 17 for removing agglomerations or clumps of powder from the surface of the vessel. Means 17 may be a scraper, brush, wire brush, knife or paddle, for example. Means 17 may be coupled to a fixed point (e.g., on the heating device 12) such that the vessel 14 rotates relative to the stationary means 17.

One means 18 for moving or for example for rotating the vessel 14 is provided in the form of a roller, as shown. The roller engages the outer circumference of the vessel 14 for rotating the vessel 14 (see arrow showing one direction of rotation). The roller 18 may be configured to rotate the vessel 14 in both rotational directions. The roller 18 may be connected to a gear or output shaft of a motor (or other motive device) to cause rotation of the roller 18. Alternatively, the vessel 14 may be directed connected to the motor, and the roller 18 may be a passive device that permits rotation of the vessel 14. A passive roller 20 also engages the outer circumference of the vessel 14 at a location spaced from the roller 18 to permit rotation of the vessel 14.

A temperature sensor 19 may be positioned within the vessel 14 (or the heating device 12) for either directly or indirectly sensing the temperature of the powder within the vessel 14.

The heating device 12, the means for moving 18, and temperature sensor 19 are directly or indirectly connected to a controller/processor 20. The controller/processor 20 is configured to control operation of the heating device 12 and the means for moving 18. The controller/processor 20 is configured to receive signals from the temperature sensor 19. A user interface 21, such as a display or keypad, is directly or indirectly connected to the controller/processor 20 for transmitting operating instructions to the controller/processor 20.

According to one exemplary method of operating the apparatus 10 for heat treating semi-crystalline or crystallizable polymer powder, the vessel 14 is first charged with a powder of a semi-crystalline or crystallizable polymer, such as a PAEK powder. The vessel 14 may then be closed by a cover (not shown). Preferably, the powder may occupy between about 10 and 70 percent of the volume of the vessel 14. More preferably, the powder may occupy between about and 60 percent of the volume of the vessel 14. More preferably, the powder may occupy between about 30 and 50 percent of the volume of the vessel 14. Alternatively, the powder may occupy less than or equal to about 50% of the volume of the vessel 14.

The heating device 12 and the means for moving 18 are then activated by the controller/processor 20. Once activated, the heating device 12 heats the powder within the vessel 14 to a predetermined temperature, depending upon the composition of the powder. This may be referred to as the heating step. The predetermined heating temperature may be a temperature value that is 20 degrees less, preferably 10 degrees less, more preferably 5 degrees less, than the melting temperature of the highest melting crystalline form of the polymer or a temperature value that is between the two melting points of the two crystalline phases of the polymer, as described in U.S. Pat. No. 9,587,107. For example, the predetermined heating temperature may be 250, or 260, or 270, or 275, or 280, or preferably 285 degrees Celsius.

The means for moving 18 rotates the vessel 14 about the axis A either (i) continuously in one rotational direction, or (ii) in a reciprocating or rocking fashion (e.g., less than one revolution in one rotational direction and less than one revolution in the opposite rotational direction, or periodically reversing at one or more than one revolution). As another example of reciprocating motion, the vessel 14 may be rotated in one rotational direction by two or three revolutions and then rotated in an opposite rotational direction by two or three revolutions. This may be referred to as the rotation or movement step. Rotation of the vessel 14 causes the powder in the vessel 14 to move and circulate, which promotes substantially even or uniform heating of the powder, faster heating of the powder, and prevents or limits hot spots in the powder. The sieve 16 (or mixing element) allows for separation of agglomerates formed and mixes the powder, therefore improving homogeneity and quality of the powder. The powder moves relative to the heated interior surfaces of the vessel 14 due to the motion of the vessel 14 and gravity. Accordingly, the grains of the powder move and do not stay fixed in place on the heated interior surfaces of the vessel 14 as the vessel 14 rotates about the axis A. As the powder passes through the sieve 16, the sieve 16 either limits or substantially prevents the formation of agglomerates in the powder and/or separates agglomerates that may be formed.

The heating and rotation steps are typically performed simultaneously for a first period of time during which the powder is heated from a starting (e.g., room) temperature to a predetermined temperature. The first period of time may be greater than 15 minutes and less than 10 hours, preferably less than 6 hours, more preferably 5 hours or less, more preferably 3 hours or less, and even more preferably, greater than 30 minutes and less than 2 hours. Once the predetermined temperature is reached, the heating and rotation steps may be continued for a second period of time while the target temperature is maintained at +/−5 degrees C. (i.e., within 5 degrees C., plus or minus, of the target temperature), or preferably at +/−3 degrees C. The second period of time may be at least at least 1 minute to 7 hours, preferably one minute up to about 6 hours, more preferably at least 1 hour to about 5 hours, even more preferably at least about 1 hour to about 4 hours. In another embodiment, the second period of time may be at least 120 minutes, or more. Once the powder is sufficiently heated to the predetermined temperature for the predetermined time, the heat treated powder is optionally cooled down, and removed from the vessel 14. The polymer powder obtained is ready for use, for example in selective laser sintering, as described for example in U.S. Pat. No. 9,587,107.

In one preferred embodiment, the vessel and/or the product may be cooled, and the cooling time and rate controlled, for example, with forced air, water spray, or a jacket with circulating fluid such as oil, water, or air. Preferably, when the product is cooled, and during the cooling step, rotation is maintained. The cooling time, which is a controlled parameter, is generally as short as possible, e.g., less than 40 minutes, preferably less than 30 minutes, more preferably less than 20 minutes, even more preferably less than 10 minutes.

Figure 2A:
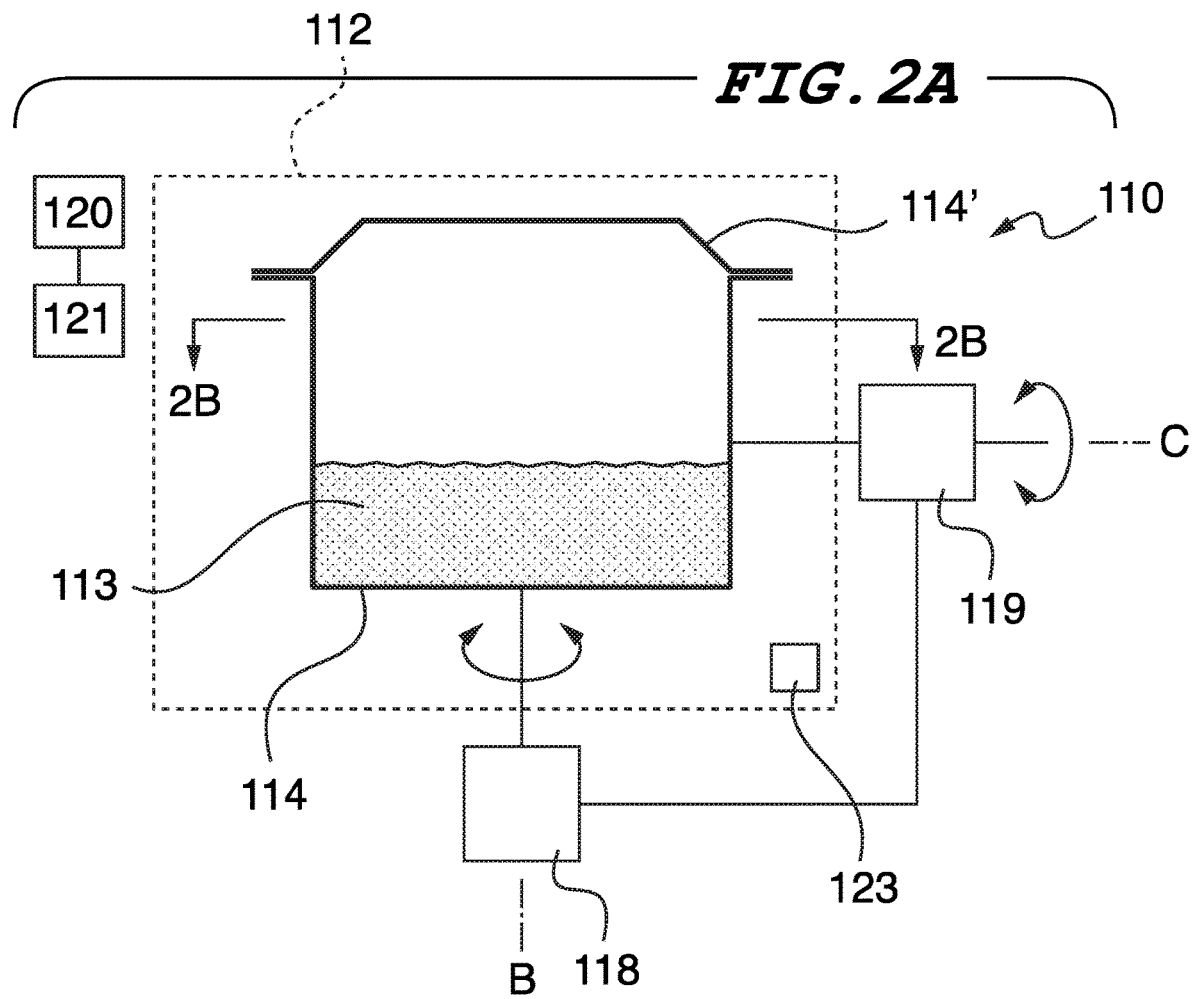
FIG. 2A depicts a cross-sectional side view of another apparatus for heat treating semi-crystalline or crystallizable polymer powder, which is shown schematically, according to a second exemplary embodiment of the invention.
Figure 2B:
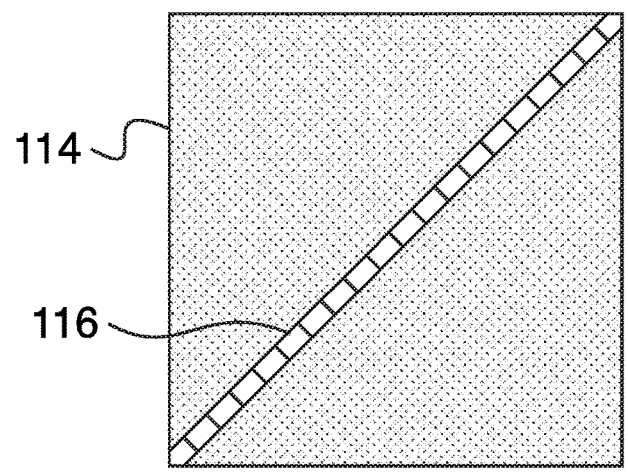
FIG. 2B is a cross-sectional side view of the apparatus of FIG. 2A taken along the line 2B-2B.

FIGS. 2A and 2B depict another apparatus 110 for heat treating semi-crystalline or crystallizable polymer powder 113, which is shown schematically, according to a second exemplary embodiment of the invention. The apparatus 110 generally comprises a heating device 112, a vessel 114 for containing the powder that is heated by the heating device 112, a grid or sieve 116 positioned within the interior of the vessel 114 and at least partially immersed within the powder, a means 118 for moving (e.g., rotating) the vessel 114 about axis B, and means 119 for moving (e.g., rotating) the vessel 114 about axis C. The vessel 114 together with the heating device 112 and the means 118 and 119 may be conventional roto-molding equipment. A suitable roto-molding machine is distributed by Ferry Industries, Inc. Roto-molding equipment is described in U.S. Pat. No. 3,474,165 to Conoco-Phillips, the disclosure of which is incorporated by reference herein in its entirety and for all purposes.

The heating device 112 is a mechanism for producing heat and exposing the vessel 114 to the heat. The heating device 112 may be an oven in which the vessel 114 is positioned. Alternatively, the heating device 112 may be a heating element that is connected to or a part of the vessel 114. The heating device 112 may be any conventional heating mechanism that is known to those skilled in the art and is not limited to that which is shown and described.

The vessel 114 is a hollow box-shaped container in which the powder is contained. The vessel 114 has a removable lid 114'. The vessel 114 is configured to rotate about axes B and C, as will be described in greater detail later. The vessel 114 is composed of thermally conductive stainless steel, such as grades 316L or 904, for example. The vessel 114 is a closed system to prevent pollution or the escapement of powder during operation.

The sieve 116 may be a foraminous plate having holes, pores or openings through which the powder can pass. Alternatively, the sieve 116 may be provided in the form of a rack having cross-wise dividing members, i.e., like a conventional oven rack. The size, shape, and number of the openings in the sieve 116 may vary. The sieve 116 may be composed of thermally conductive stainless steel, such as grades 316L or 904, for example. The sieve 116 may extend between two opposing interior corners of the vessel 114, and is substantially stationary with respect to the vessel 114. The sieve 116 may be permitted to move with respect to the vessel 114 by a slight amount or may be fixed in place within the vessel 114. Alternatively, the sieve 116 may be replaced by metallic balls or similar object as described above. As another alternative, the sieve 116 may be omitted altogether.

The means 118 for moving the vessel 114 about axis B is (optionally) a motor having a shaft that is connected (either directly or indirectly) to the base of the vessel 114, as shown. The means 118 may be configured to rotate the vessel 114 in both rotational directions about axis B.

The means 119 for moving the vessel 114 about axis C is (optionally) a motor having a shaft that is connected (either directly or indirectly) to the side of the vessel 114, as shown. The means 119 may be configured to rotate the vessel 114 in both rotational directions about axis C. The means 119 also rotates the means 118 as it rotates the vessel 114 (or vice versa) such that the means 118 and 119 can operate at the same time to rotate the vessel 114 about both axes B and C simultaneously.

The means 118 and 119 may vary from that which is shown and described. As one alternative, one of the means 118 and 119 may be omitted. As another alternative, a third means for moving the vessel may be provided for rotating the vessel about a third axis that is normal to the axes B and C. As yet another alternative, the means 118 and/or 119 may shake (or vibrate) the vessel 114 in a reciprocating fashion along axes B and C, respectively, in lieu of rotation. Another means may shake (or vibrate) the vessel 114 in a reciprocating fashion along a third axis that is normal to the axes B and C.

A temperature sensor 123 may be positioned within the vessel 114 (or the heating device 112) for either directly or indirectly sensing the temperature of the powder 113 within the vessel 114.

The heating device 112, the means 118 and 119, and temperature sensor 123 are directly or indirectly connected to a controller/processor 120. The controller/processor 120 is configured to control operation of the heating device 112 and the means 118 and 119. The controller/processor 120 is configured to receive signals from the temperature sensor 123. A user interface 121, such as a display or keypad, is directly or indirectly connected to the controller/processor 120 for transmitting operating instructions to the controller/processor 120.

According to one exemplary method of operating the apparatus 110 for heat treating semi-crystalline or crystallizable polymer powder, the vessel 114 is first charged with polymer powder 113. The powder may occupy less than the overall volume of the vessel 114, as described above. The heating device 112 and the means 118 and 119 are then activated by the controller/processor 120. Once activated, the heating device 112 heats the powder within the vessel 114 to a predetermined temperature, depending upon the composition of the powder, as explained above with respect to the apparatus 10. The temperature is controlled so as to avoid or minimize melting, agglomeration or fusion of the powder.

During the heating process, the means 118 rotates the vessel 114 about the axis B either (i) continuously in one rotational direction, or (ii) in a reciprocating or rocking fashion (e.g., less than one revolution in one rotational direction and less than one revolution in the opposite rotational direction). Similarly, the means 119 rotates the vessel 114 about the axis C either (i) continuously in one rotational direction, or (ii) in a reciprocating or rocking fashion (e.g., less than one revolution in one rotational direction and less than one revolution in the opposite rotational direction). The means 118 and 119 may or may not operate simultaneously. This may be referred to as the rotation or movement step.

Rotation of the vessel 114 causes the powder in the vessel 114 to move and circulate the grains of the powder, which promotes substantially even or uniform heating of the powder and prevents or substantially limits hot spots in the powder. The sieve 116 (or mixing element) enables separation of any agglomerates formed mixes the powder, thereby improving homogeneity and quality of the powder. The powder moves relative to the heated surfaces of the vessel 114. Accordingly, the grains of the powder move and do not stay fixed in place on the vessel 114 as the vessel 114 rotates about the axes B and C. As the powder passes through the sieve 116, the sieve 116 limits, or prevents the formation of agglomerates in the powder, or separates any agglomerates that may have formed.

The heating and rotation steps are typically performed as described above with respect to the apparatus 10.

The vessel and/or the product may be cooled, and the cooling time and rate controlled, for example, with forced air, water spray, or a jacket with circulating fluid such as oil, water, or air. Preferably, when the product is cooled, and during the cooling step, rotation is maintained. The cooling time, which is a controlled parameter, is generally as short as possible, e.g., less than 40 minutes, preferably less than 30 minutes, more preferably less than 20 minutes, even more preferably less than 10 minutes.

During testing of the apparatus 110, it was found that the powder reached a predetermined temperature (e.g. about 285 degrees Celsius) in about ninety minutes and the temperature of the powder was substantially homogeneous, owing to the continuous movement of the powder on the heated surface of the vessel 114. Without intending to be bound to any theory, it is believed that rotating the vessel 114 continuously renews the strata of powder in contact with the heated interior surface of the vessel 114 so that a new strata of powder is continuously replacing an old strata of powder on the heated surface of the vessel 114. Homogeneity of the powder temperature is important because the temperature range of the heat treatment preferably is limited, maintained, and controlled. More particularly, exceeding the maximum temperature of the temperature range of the heat treatment caused melting and agglomeration of the powder. In contrast, effective heat treatment in accordance with the teachings of this invention achieved attainment of a desired modified crystalline structure.

Figure 3:
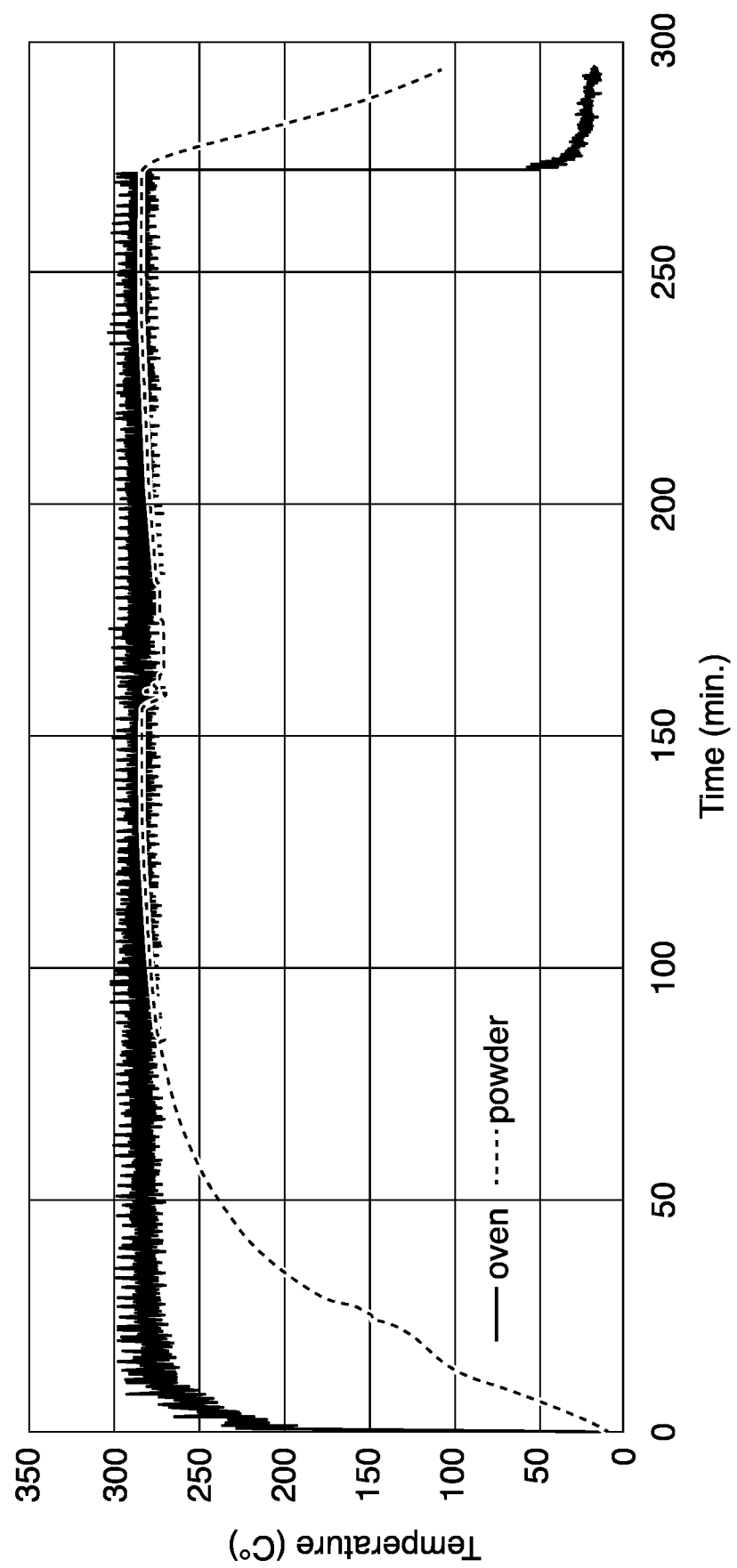
FIG. 3 depicts a typical temperature profile for heat-treatment of semi-crystalline or crystallizable polymer powder using roto-molding equipment.

FIG. 3 depicts a typical temperature profile for heat-treatment of polymer powder using roto-molding equipment. That figure shows that it takes approximately 100 minutes for the powder to reach the target temperature of about 275 degrees Celsius.

In reducing the invention to practice, the apparatuses 10 and 110 were discovered to be commercially viable devices for heat-treating semi-crystalline or crystallizable polymer powder as compared to other known devices, which are described hereinafter in the Comparative Examples section.

The types of apparatus and methods described herein are useful for use in connection with powders of semi-crystalline or crystallizable polymers, including polymorphic semi-crystalline or crystallizable polymers. This invention is not limited to the particular preferred embodiments described herein, and further includes any vessel with a means to cause the powder within the vessel to move with respect to the vessel.

The polymers which can be used in connection with the present invention include polymorphic semicrystalline polymers and/or polymers capable of becoming semicrystalline upon being subjected to temperatures above the glass transition temperature of the polymer. As used herein, the term "polymorphic semicrystalline or crystallizable polymer" means that the polymer is capable of existing in one or more than one crystalline form and that the polymer has one or more regions that is crystalline and/or is capable of forming one or more regions of crystallinity upon heat treatment.

According to various aspects of the invention, powders of polyaryletherketone (PAEK) polymers may be employed. For example, such a PAEK polymer powder may be a powder of a polymer selected from the group consisting of polyetheretherketone (PEEK), polyetherketoneketone (PEKK), polyetherketone (PEK), polyetheretherketoneketone (PEEKK), polyetherbiphenyletherketone (PEDEK) and polyetherketoneetherketoneketone (PEKEKK). Blends or mixtures or copolymers of polyaryletherketones such as PEEK-PEDEK as disclosed in WO 2015/124903 may also be employed within the scope of this invention. Other polymorphic polymers that could benefit from heat-treatment using an apparatus in accordance with the invention or a process in accordance with the invention include, but are not limited to: polyamide 11 (PA11), polyamide 12 (PA12) and polyvinylidene fluoride (PVDF) homopolymers and copolymers.

An apparatus or process in accordance with the present invention could also be applicable to polymeric materials with a single crystal form such as PEEK (polyetheretherketone) and PEK (polyether ketone), where the treatment at elevated temperatures will increase the linear degree of crystallinity of the crystalline lamellae, affecting in a direct manner the melting temperature and/or the shape of the melting peak as observed by DSC (during the first heating, as described in ISO 11357) of the final product.

The present invention is especially useful for polyetherketoneketones (PEKK). Polyetherketoneketones are well-known in the art and can be prepared using any suitable polymerization technique, including the methods described in the following patents, the disclosure of each of which is incorporated herein by reference in its entirety for all purposes: U.S. Pat. Nos. 3,065,205; 3,441,538; 3,442,857; 3,516,966; 4,704,448; 4,816,556; and 6,177,518. PEKK polymers differ from the general class of PAEK polymers in that they often include two different isomeric repeating units. These repeating units can be represented by the following Formulas and II:

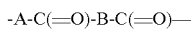    -A-C(=O)-B-C(=O)—    I

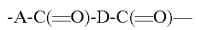    -A-C(=O)-D-C(=O)—    II where A is a p,p'-Ph—O—Ph-group, Ph is a phenylene radical, B is p-phenylene, and D is m-phenylene. The Formula I:Formula II isomer ratio, commonly referred to as the T:I ratio, in the polyetherketoneketone is selected so as to vary the total crystallinity of the polymer. The T:I ratio is commonly varied from 50:50 to 100:0, and in some embodiments 60:40 to 80:20, or 55:45 to 90:10. A higher T:I ratio such as, 80:20, provides a higher degree of crystallinity as compared to a lower T:I ratio, such as 60:40. According to certain embodiments, the powder treated in accordance with the present invention is a PEKK powder having a T:I ratio of about 60:40, or about 70:30, or about 80:20, or about 50:50.

Suitable polyetherketoneketones are available from several commercial sources under various brand names. For example, polyetherketoneketones are sold under the brand name KEPSTAN® polymers by Arkema. In addition to using polymers with a specific T:I ratio, mixtures of polyetherketoneketones may be employed.

The powders used in the present invention may be produced directly by synthesis or by a variety of processes such as grinding, air milling, spray drying, freeze-drying, or direct melt processing to fine powders. Preferably, the powder is first produced and the heat treatment is performed. The heat treatment process and the powders produced by this process are not limited to any particular particle size. The particle size of the powder can be adjusted prior to or after the heat treatment process based on the needs of the specific application. In general, powders useful in the present invention may have a median volume average particle size/diameter of between 0.002 microns to 0.1 meter, and more preferably from 0.01 microns to 1.0 mm. For use in selective laser sintering (SLS), a median volume average particle size/diameter of 15 to 150 microns may be preferred, and more preferably from 30 to 75 microns. "Median volume average particle size" and "median volume average particle diameter" are used interchangeably herein.

In accordance with certain non-limiting aspects of the present invention, PEKK flakes are ground to produce PEKK powders having a median volume average particle diameter of between about 10 microns and about 150 microns, as measured using the dry powder using laser light scattering methods known in the art such as such as ISO 13320:2009. As used herein, "powder" may refer to a material composed of small particles of PEKK. The PEKK powders can have a median volume average particle size of about 10, 20, 30, 40, 50, 60, 70, 80, 90, 100, 110, 120, 130, 140, or about 150 microns. In preferred aspects, the PEKK powders have a median volume average particle size of about 30 microns to about 100 microns. In other preferred aspects, the PEKK powders have a median volume average particle size of about 50 microns.

In accordance with certain non-limiting aspects of the present invention, polymorphic semicrystalline or crystallizable polymers of a variety of structures may be heat-treated in a way that increases, decrease, or adjusts the melting point or the shape of the melting peak of the crystals to afford better powder handling and durability in applications that require powder flow at elevated temperatures. The polymorphic semicrystalline or crystallizable polymers may be heat treated in a way that induces crystallization and/or converts the crystalline polymer into a different, thermodynamically more stable crystal form.

In one non-limiting embodiment, the polymer comprises a polyetherketoneketone (PEKK) capable of having at least two crystalline forms. In this embodiment, it is possible that the PEKK is initially amorphous, but upon being subjected to heat treatment, at least a portion of the PEKK converts to at least one crystalline form, which form is capable of being converted at least in part to a higher melting crystalline form. The heat treatment step is then capable of increasing the content of the higher melting crystalline form by subjecting the polymer composition to a temperature below the melting point of the highest melting crystalline form and within or above the melting range of the other crystalline form(s), for a time that increases the content of the highest melting crystalline form relative to the other crystalline form(s) in the polymer composition.

In yet another embodiment, a process is provided for increasing the content of one crystal form of polyetherketoneketone that includes at least the step of heat treating a polymer composition comprising another crystal form of polyetherketoneketone at a temperature within or above the melting range of the lower melting crystal form of polyetherketoneketone and below the melting point of the higher melting crystal form of polyetherketoneketone. In this embodiment, again it is possible that the starting polyetherketoneketone is initially amorphous, but upon heat treatment, at least a portion of the polyetherketoneketone converts to one or both other crystal forms.

Powders which have been heat-treated using an apparatus according to the invention or a process according to the invention may be converted to useful articles or a coating on an article using any suitable or known method for converting polymer powders, including but not limited to selective laser sintering, roto-molding and powder coating.

Invention Example 1: Rotatable Vessel Placed in an Oven Like that Shown in FIG. 1

Material: Kepstan® 6002 PL PEKK powder (a product of Arkema, Inc.) having a median volume average particle size of about 50 microns. Filling: about 30% of the vessel in volume.

Process: The vessel was filled with polymer powder at room temperature. The filled vessel was placed in the oven. The set point temperature of the oven was fixed at 293° C. A set point temperature of 293° C. led to a thermal treatment of the polymer powder at 285° C. The set temperature (293° C.) was reached after 2 hours and subsequently held for 3 hours. The vessel was moved by constant rotation at 10 rpm. The powder-filled vessel was then removed from the oven and then cooled with pulsed air. During this stage, rotation of the vessel was maintained. The treated powder can be sieved before future use. The median volume average particle size of the so-obtained powder was measured to be about 50+/−3 microns.

Invention Example 2: Rotatable Vessel Placed in an Oven Like that Shown in FIG. 1

Material: Kepstan® 6002 PL PEKK powder having a median volume average particle size of about 50 microns. Filling: about 10% of the vessel.

Process: The vessel was filled with polymer powder at room temperature. The filled vessel was placed in the oven. The set point temperature of the oven was fixed at 293° C. A set point temperature of 293° C. led to a thermal treatment of the powder at 285° C. The set temperature (293° C.) was reached within 2 hours and subsequently held for 3 hours. The vessel was moved by constant rotation at 10 rpm. The powder-filled vessel was removed from the oven and then cooled with pulse air. During this stage, rotation of the vessel was maintained. The treated powder can be sieved before future use. The median volume average particle size of the so-obtained powder was measured to be about 50+/−3 microns.

Invention Example 3: Rotatable Vessel Placed in an Oven Like that Shown in FIG. 1

Material: Kepstan® 6002 PL PEKK powder having a median volume average particle size of about 50 microns. Filling: about 50% of the vessel.
Process: The vessel was filled with polymer powder at room temperature. The filled vessel was placed in the oven. The set point temperature of the oven was fixed at 293° C. A set point temperature of 293° C. led to a thermal treatment of the powder at 285° C. The set temperature (293° C.) was reached within 2 hours and subsequently held for 3 hours. The vessel was moved by constant rotation at 10 rpm. The powder-filled vessel was removed from the oven and then cooled with pulse air. During this stage, rotation of the vessel was maintained. The treated powder can be sieved before future use. The median volume average particle size of the so-obtained powder was measured to be about 50+/−3 microns.

Invention Example 4: Rotatable Vessel Placed in an Oven Like that Shown in FIG. 1

Material: Kepstan® 6002 PL PEKK powder having a median volume average particle size of about 50 microns. Filling: about 55% of the vessel in volume.
Process: The vessel was filled with polymer powder at room temperature. The filled vessel was placed in the oven. The set point temperature of the oven was fixed at 293° C. A set point temperature of 293° C. led to a thermal treatment of the polymer powder at 285° C. The set temperature (293° C.) was reached after 2 hours and subsequently held for 5 hours. The vessel was moved by constant rotation at 10 rpm. The powder-filled vessel was then removed from the oven and then cooled with pulsed air. During this stage, rotation of the vessel was maintained. The treated powder can be sieved before future use. The median volume average particle size of the so-obtained powder was measured to be about 50+/−3 microns.

Invention Example 5: Rotatable Vessel Placed in an Oven Like that Shown in FIG. 1

Material: Kepstan® 6002 PL PEKK powder (a product of Arkema, Inc.) having a median volume average particle size of about 50 microns. Filling: about 30% of the vessel in volume.
Process: The vessel was filled with polymer powder at room temperature. The filled vessel was placed in the oven. The set point temperature of the oven was fixed at 281° C. A set point temperature of 281° C. led to a thermal treatment of the polymer powder at 275° C. The set temperature (281° C.) was reached after 2 hours and subsequently held for 3 hours. The vessel was moved by constant rotation at 10 rpm. The powder-filled vessel was then removed from the oven and then cooled with pulsed air. During this stage, rotation of the vessel was maintained. The treated powder can be sieved before future use. The median volume average particle size of the so-obtained powder was measured to be about 50+/−3 microns.

Invention Example 6: Rotatable Vessel Placed in an Oven Like that Shown in FIG. 1

Material: Kepstan® 6002 PEKK powder (a product of Arkema, Inc.) having a median volume average particle size of about 70 microns. Filling: about 30% of the vessel in volume.
Process: The vessel was filled with polymer powder at room temperature. The filled vessel was placed in the oven. The set point temperature of the oven was fixed at 293° C. A set point temperature of 293° C. led to a thermal treatment of the polymer powder at 285° C. The set temperature (293° C.) was reached after 2 hours and subsequently held for 3 hours. The vessel was moved by constant rotation at 10 rpm. The powder-filled vessel was then removed from the oven and then cooled with pulsed air. During this stage, rotation of the vessel was maintained. The treated powder can be sieved before future use. The median volume average particle size of the so-obtained powder was measured to be about 70+/−5 microns.

Invention Example 7: Rotatable Vessel Placed in an Oven Like that Shown in FIG. 2A Material: Kepstan® 6002 PL powder having a median volume average particle size of about 50 microns.
Equipment: STP Lab 40 Rotomolder, using a parallelepiped chamber made of 4.76 mm 304 Stainless Steel having the following dimension: 431×431×675 mm$^3$.
Process: 20 kg of polymer powder was placed in the chamber, together with a stainless steel grid that is placed diagonally in the chamber, as shown in FIG. 2B. The volume occupied by the powder was about 42% of the overall volume of the chamber. The oven temperature was set at 285° C. The chamber was placed in the oven, and continuously rotated along two axes as shown in FIG. 2A. The temperature of the powder inside the mold was monitored with a rotolog and recorded. As shown in FIG. 3, after about 2 hours, the powder reached the target temperature of 285+/−3° C., and then the powder was held 3 more hours at this temperature. It is noted that FIG. 3 has been modified to smooth the curve depicting the powder temperature. The chamber was then removed from the oven and cooled using forced air. When discharged, the powder was a free-flowing powder with less than 15% of agglomerates that can easily be separated from the powder with sieving at 260 microns. The agglomerates were found to be easily breakable back to fine powder with mild pressure applied. No crust/agglomeration/melted product was found on the walls of the chamber. The median volume average particle size of the so-obtained powder was measured to be about 50+/−3 microns.

Comparative Examples: KEPSTAN® 6002 PL polymer powder having a median volume average particle size of about 50 microns was used during testing in each of the comparative examples below.

Comparative Example 1: Circulating Air Oven

Following extensive testing, the efficiency and productivity of a circulating air oven was found to be low. Because of the poor heat transfer coefficient of the powder, only thin layers of powder were treated at a time which rendered the process too slow to be acceptable. In one example, a 5 cm thick layer of powder required about 7 hours before the inner temperature of the powder reached the temperature of the oven (e.g., 285 degrees Celsius).

Comparative Example 2: Screw/Agitator/Stirring Device

Some prior art references, such as U.S. Patent App. Pub. No. 20120364697, the disclosure of which is incorporated by reference herein in its entirety and for all purposes, mention the possibility of immersing a stirring device in the powder for circulating the powder. It is noted that the vessel in which the powder is contained remains stationary. In a comparison test, it was found that this method produced non-uniform heating of the powder and hot spots, which could lead to melted polymer, fouling on the walls of the equipment (thus slowing down the heat transfer process), agglomerated powder, and lumps in the heat treated powder.

Comparative Example 3: Fluidized Bed

In a fluidized bed heater, the powder is contained within a vessel and the outer walls of a vessel are heated. At the same time, a gas (such as air) is passed through the vessel at high enough velocities to suspend the solid in the gas stream. In a comparison test, it was found that the quantity of air required to generate powder fluidization did not allow the powder to reach the predetermined temperature for heat treatment before the powder exited the vessel.

Comparative Example 4: Paddle Dryer

Paddle dryers are mechanically agitated, indirect heat transfer devices that add or remove heat from a process mass. Paddle dryers can be used for indirect drying, heating, cooling, pasteurization, crystallizing, and reacting of powders and granules. During operation, the vessel and the paddles are heated, and the powder is distributed into the vessel. In a comparison test, it was found that powder did not reach the predetermined temperature (e.g., 260 degrees Celsius instead of the targeted temperature of 285 degrees Celsius) for heat treatment at least in part due to an insulating layer formed by agglomeration of powder positioned inside of the paddle dryer.

Comparative Example 5: Vibrating Heat Treatment Unit

In a vibrating heat treatment unit, a spiral tube is both vibrated and heated by electrical current. Powder is introduced at the bottom opening of the tube and, owing to the vibrations, the powder is transported inside of the heated spiral tube, becomes heated and exits through a top opening of the tube. In a comparison test, it was found that powder became lodged in the spiral and was not able to exit through the top opening.

Aspects of the Present Invention

Various illustrative aspects of the present invention may be summarized as follows:

Aspect 1: A method for heat treating a powder of a polymorphic semi-crystalline or crystallizable polymer, the method comprising:

heating the powder that is contained within an interior region of a vessel to a temperature that is less than a melting temperature of a highest melting crystalline form of the polymer; and moving the vessel to cause the powder within the vessel to move with respect to the vessel.

Aspect 2: The method of Aspect 1, wherein the powder comprises polyaryletherketone (PAEK), more preferably polyetherketoneketone (PEKK), and most preferably polyetherketoneketone (PEKK) having a T:I ratio of about 60:40.

Aspect 3: The method of Aspect 2, wherein the powder comprises polyetherketoneketone (PEKK) and the heating step comprises heating the PEEK powder to a temperature of 230 degrees Celsius to 295 degrees Celsius or 260 degrees Celsius to 290 degrees Celsius.

Aspect 4: The method of any of Aspects 1 to 4 further comprising laser sintering the heat-treated powder.

Aspect 5: The method of any of Aspects 1 to 4, wherein the heating step comprises heating the powder to a temperature above a glass transition temperature (Tg) of the polymer.

Aspect 6: The method of any of Aspects 1 to 5 further comprising either moving the powder through a sieve that is positioned within the vessel or moving mixing elements having a compact shape through the powder.

Aspect 7: The method of any of Aspects 1 to 6 further comprising moving the powder through a sieve that is positioned within the vessel and rotating the sieve along with the vessel.

Aspect 8: The method of any of Aspects 1 to 7 further comprising rotating the vessel in a single rotational direction about a first axis of the vessel.

Aspect 9: The method of any of Aspects 1 to 8 further comprising rotating the vessel in two different rotational directions about the first axis of the vessel.

Aspect 10: The method of any of Aspects 1 to 9 further comprising rotating the vessel in a first rotational direction about the first axis of the vessel, and before reaching one revolution of the vessel, rotating the vessel in a second rotational direction that is opposite to the first rotational direction.

Aspect 11: The method of any of Aspects 1 to 10, further comprising rotating the vessel about a second axis of the vessel that is normal to the first axis.

Aspect 12: The method of Aspect 11 further comprising simultaneously rotating the vessel about the first and second axes.

Aspect 13: The method of any of Aspects 1 to 12, further comprising positioning the vessel within an oven.

Aspect 14: The method of any of Aspects 1 to 13, wherein the vessel forms part of a roto-molding unit.

Aspect 15: The method of any of Aspects 1 to 14 further comprising removing agglomerations from an interior surface of the vessel during movement of the vessel.

Aspect 16: An apparatus for heat treating a powder of polymorphic semi-crystalline or crystallizable polymer, the apparatus comprising:

a heating device for heating the powder to a temperature that is less than the melting temperature of a highest melting crystalline form of the polymer;

a vessel that is exposed to heat produced by the heating device, the vessel defining an interior region for containing the powder; and means for moving the vessel to cause the powder within the vessel to move with respect to the vessel.

Aspect 17: The apparatus of Aspect 16 further comprising a sieve positioned within the vessel for sieving the powder within the vessel upon movement of the vessel.

Aspect 18: The apparatus of Aspect 17, wherein the sieve is a foraminous panel.

Aspect 19: The apparatus of any of Aspects 16 to 18, wherein the means for moving is a motor shaft that is configured to rotate the vessel, the motor shaft being attached either directly or indirectly to the vessel.

Aspect 20: The apparatus of any of Aspects 16 to 19, wherein the means for moving is a motorized roller that is positioned in contact with the vessel for rotating the vessel.

Aspect 21: The apparatus of any of Aspects 16 to 20, wherein the vessel is a cylindrical tube.

Aspect 22: The apparatus of any of Aspects 16 to 20, wherein the vessel is box shaped.

Aspect 23: The apparatus of any of Aspects 16 to 22, wherein the heating device is an oven and the vessel is positioned within the oven.

Aspect 24: The apparatus of any of Aspects 16 to 22, wherein the heating device is a heating element, and the heating element is connected to the vessel.

Aspect 25: The apparatus of any of Aspects 16 to 24, wherein the apparatus is a roto-molding unit.

Aspect 26: The apparatus of any of Aspects 16 to 25, further comprising means for removing agglomerations from an interior surface of the vessel.

Within this specification, embodiments have been described in a way which enables a clear and concise specification to be written, but it is intended and will be appreciated that embodiments may be variously combined or separated without departing from the invention. For example, it will be appreciated that all preferred features described herein are applicable to all aspects of the invention described herein.

Although the invention is illustrated and described herein with reference to specific embodiments, the invention is not intended to be limited to the details shown. Rather, various modifications may be made in the details within the scope and range of equivalents of the claims and without departing from the invention.

What is claimed is:

1. A method for heat treating a powder of a semi-crystalline or crystallizable polymer comprising polyaryletherketone (PAEK), the method comprising:
    heating untreated powder of said semi-crystalline or crystallizable polymer comprising PAEK contained within an interior region of a vessel to a temperature that is less than the melting temperature of a highest melting crystalline form of the polymer; and
    simultaneously for at least a first period of time during the heating step, moving the vessel to cause the untreated powder of said semi-crystalline or crystallizable polymer comprising PAEK within the vessel to move with respect to the vessel,
    optionally heating and moving the vessel for a second period of time,
    to produce a heat-treated powder comprising PAEK.

2. The method of claim 1, wherein the powder comprises polyetherketoneketone (PEKK) and the heating step comprises heating the powder to a temperature of 230 degrees Celsius to 295 degrees Celsius or 260 degrees Celsius to 290 degrees Celsius.

3. The method of claim 1, wherein the heating step comprises heating the powder to a temperature above a glass transition temperature (Tg) of the polymer.

4. The method of claim 1 further comprising either moving the powder through a mixing element or moving mixing elements having a compact shape through the powder.

5. The method of claim 1 further comprising moving the powder through a mixing element and rotating a sieve along with the vessel.

6. The method of claim 1 further comprising rotating the vessel in a single rotational direction about a first axis of the vessel.

7. The method of claim 1 further comprising rotating the vessel in two different rotational directions about the first axis of the vessel.

8. The method of claim 1 further comprising rotating the vessel in a first rotational direction about the first axis of the vessel, and before reaching one revolution of the vessel, rotating the vessel in a second rotational direction that is opposite to the first rotational direction.

9. The method of claim 1 further comprising rotating the vessel about a second axis of the vessel that is normal to the first axis.

10. The method of claim 9 further comprising simultaneously rotating the vessel about the first and second axes.

11. The method of claim 1 further comprising positioning the vessel within an oven.

12. The method of claim 1 wherein the vessel forms part of a roto-molding unit.

13. The method of claim 1 further comprising removing agglomerations from an interior surface of the vessel during movement of the vessel.

* * * * *